US006867388B2

(12) United States Patent
Grewell et al.

(10) Patent No.: US 6,867,388 B2
(45) Date of Patent: Mar. 15, 2005

(54) ELECTRONIC MASKING LASER IMAGING SYSTEM

(75) Inventors: David A. Grewell, Cincinnati, OH (US); Donald C Lovett, Shelton, CT (US)

(73) Assignee: Branson Ultrasonics Corporation, Danbury, CT (US)

( * ) Notice: Subject to any disclaimer, the term of this patent is extended or adjusted under 35 U.S.C. 154(b) by 38 days.

(21) Appl. No.: 10/409,236

(22) Filed: Apr. 8, 2003

(65) Prior Publication Data

US 2004/0200812 A1 Oct. 14, 2004

(51) Int. Cl.[7] .............................................. B23K 26/20
(52) U.S. Cl. ................................................. 219/121.64
(58) Field of Search ........................ 219/121.6, 121.61, 219/121.63, 121.64, 121.65, 121.66, 121.73, 121.83, 121.85

(56) References Cited

U.S. PATENT DOCUMENTS

| 5,260,542 | A | * | 11/1993 | Ishiguro et al. ........ 219/121.68 |
| 5,676,866 | A | | 10/1997 | in den Baumen et al. |
| 5,719,654 | A | * | 2/1998 | Wiltshire et al. ........... 349/158 |
| 5,739,502 | A | | 4/1998 | Anderson et al. |
| 5,770,123 | A | | 6/1998 | Hatakeyama et al. |
| 5,908,719 | A | | 6/1999 | Guckel et al. |
| 6,028,288 | A | * | 2/2000 | Moriike .................. 219/121.69 |
| 6,031,201 | A | | 2/2000 | Amako et al. |
| 6,064,034 | A | | 5/2000 | Rieck |
| 6,417,481 | B2 | | 7/2002 | Chen et al. |
| 6,465,757 | B1 | | 10/2002 | Chen |

FOREIGN PATENT DOCUMENTS

| EP | 0 997 261 | 10/2000 |
| WO | WO 95/16570 | 6/1995 |

* cited by examiner

Primary Examiner—Samuel M. Heinrich
(74) Attorney, Agent, or Firm—Harness, Dickey & Pierce, P.L.C.

(57) ABSTRACT

A laser imaging apparatus having a laser source outputting a laser beam and an electronic display device. The electronic display device is positioned downstream from the laser source. The electronic display device is operable to selectively polarize a discrete portion of the laser beam to define a modified portion and an unmodified portion. A polarizing filter is then positioned downstream from the display device so as to prevent passage of either the modified portion or the unmodified portion of the laser beam therethrough so as to define an imaging beam having a specific pattern.

13 Claims, 2 Drawing Sheets

ELECTRONIC MASKING LASER IMAGING SYSTEM

FIELD OF THE INVENTION

The present invention relates generally to laser imaging and, more particularly, relates to an improved apparatus for producing varying shaped imaging patterns.

BACKGROUND OF THE INVENTION

Laser welding is commonly used to join plastic or resinous parts, such as thermoplastic parts, at a welding zone. An example of such use of lasers can be found in U.S. Pat. No. 4,636,609, which is expressly incorporated herein by reference.

As is well known, lasers provide a focused beam of electromagnetic radiation at a specified frequency (i.e., coherent monochromatic radiation). There are a number of types of lasers available; however, infrared lasers or non-coherent sources provide a relatively economical source of radiative energy for use in heating a welding zone. One particular example of infrared welding is known as Through-Transmission Infrared (TTIr) Welding. TTIr welding employs an infrared laser capable of producing infrared radiation that is directed by fiber optics, waveguides, or light guides through a first plastic part and into a second plastic part. This first plastic part is often referred to as the transmissive piece, since it generally permits the laser beam from the laser to pass therethrough. However, the second plastic part is often referred to as absorptive piece, since this piece generally absorbs the radiative energy of the laser beam to produce heat in the welding zone. This heat in the welding zone causes the transmissive piece and the absorptive piece to be melted and, with intimate contact, welded together.

It is often desirable to produce heating patterns and/or welds with various shapes. This is can be accomplished using metal masks. Masks are generally sheets of metal that are machined, etched, laser cut, or otherwise modified to permit only a specific shape of radiation energy to pass therethrough—the remaining radiation energy is either reflected back or absorbed. The manufacturing of these metal masks is often laborious, slow, and costly. In addition, these metal masks are not easily modified, thereby limiting their usefulness.

Metal masks further limit the range of heating patterns and/or welds that may be produced. That is, in some instances the physical limitations of metal masks require that any section of masking that is not attached to the original sheet of material be retained, using external supports. Similar to stencils, the letter O would require the center section to be coupled to the outer section via a bridge member or using a separate glass sheet in order to maintain the proper alignment thereof. As is readily apparent, these physical limitations prevent many shapes from being used in laser welding.

Accordingly, there exists a need in the relevant art to provide an apparatus that is capable of quickly and conveniently defining a mask used in laser welding. Furthermore, there exists a need in the relevant art to provide a masking apparatus that is capable of being easily modified. Still further, there exists a need in the relevant art to provide a masking apparatus that is capable of producing complex shapes without the need for external supports that may interfere with the produced weld pattern. Lastly, there exists a need in the relevant art to provide a masking apparatus that is capable of overcoming the disadvantages of the prior art.

SUMMARY OF THE INVENTION

According to the principles of the present invention, a laser imaging apparatus is provided having an advantageous construction and method of using the same. The laser imaging apparatus includes a laser source outputting a laser beam and an electronic display device. The electronic display device is positioned downstream from the laser source and is operable to selectively polarize a discrete portion of the laser beam to define a modified portion and an unmodified portion. A polarizing filter is then positioned downstream from the display device so as to prevent passage of either the modified portion or the unmodified portion of the laser beam therethrough so as to define an imaging beam having a specific pattern.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment is merely exemplary in nature and is in no way intended to limit the invention, its application, or uses. Furthermore, it should be understood that although the present invention is described in connection with TTIr welding, the present invention is equally applicable to other forms of welding and/or surface heating using light energy. Additionally, the present invention may find utility in a wide range of varying imaging applications not related to welding, such as in lithography, which is often used to form IC chips, micro-electro-mechanical systems (MEMS), micro devices in general, and the like. Therefore, the present invention should not be regarded as being limited to the specific welding application described below.

Figure 1:
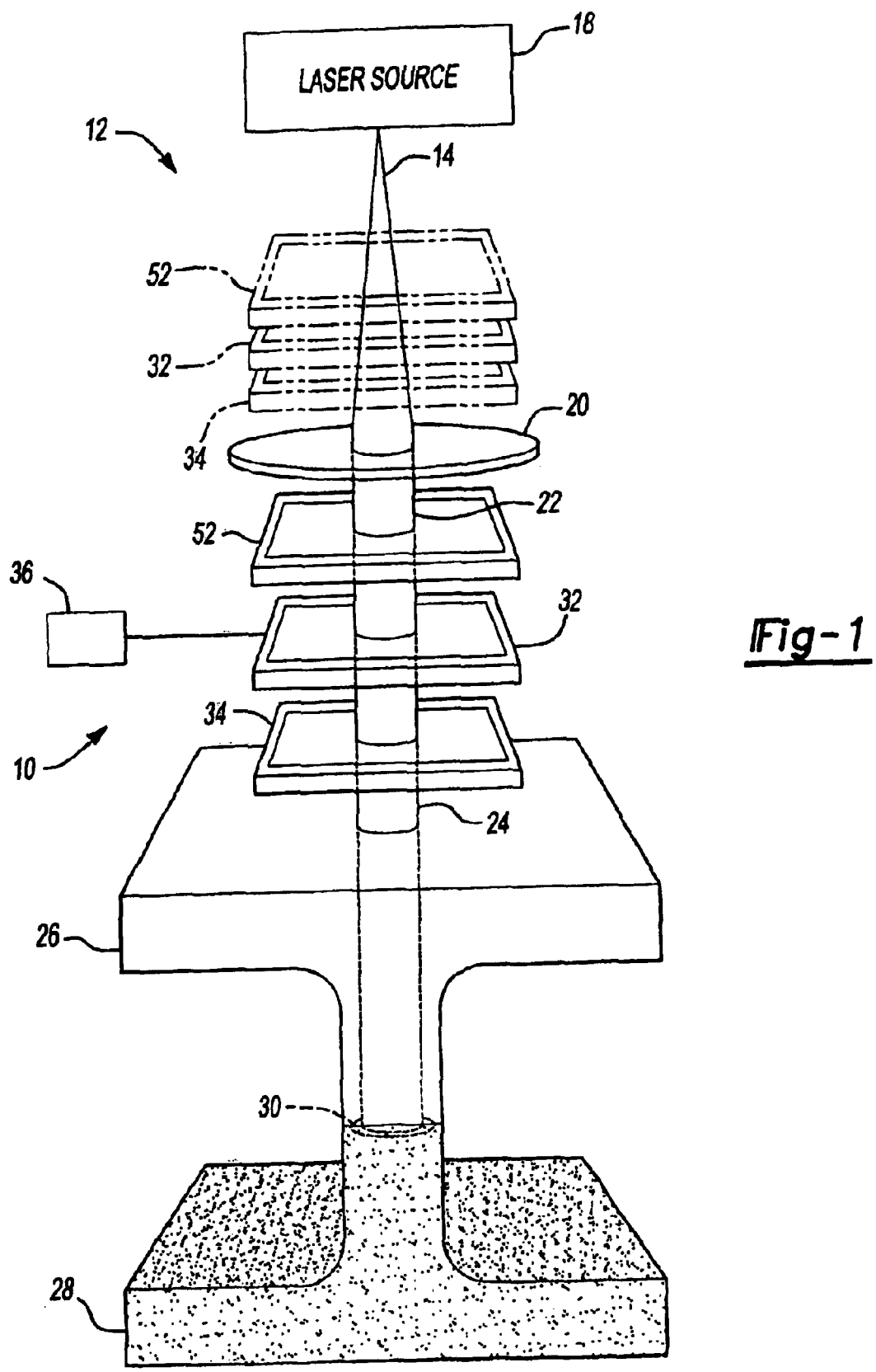
FIG. 1 is a schematic view illustrating an electronic masking laser imaging system according to the principles of the present invention, including optional equipment.

Referring to the drawings, an electronic masking system 10 is illustrated in accordance with the principles of the present invention. According to the present embodiment, electronic masking system 10 is adapted for use with a TTIr welding system 12. As seen in FIG. 1, TTIr welding system 12 may include an optional fiber optic bundle 14 comprised of a plurality of optical fibers generally arranged in a circular pattern capable of carrying or transmitting radiative energy in the form of a laser beam therethrough. Fiber optic bundle 14 is operably coupled to a laser source 18, such as an infrared laser, according to known principles. Alternatively, TTIr welding system 12 may include a lightguide member being formed of sheets of silicone, polycarbonate, or glass. An optional lens assembly 20 may also be employed to tailor the radiative energy into a predetermined profile. That is, lens assembly 20 may be used to either focus or distribute laser energy either upstream or downstream of electronic masking system 10 through the use of optical principles.

In operation, laser source 18 outputs a laser beam that is carried by fiber optic bundle 14. This laser beam passes through lens assembly 20 and exits therefrom at reference 22. The laser beam then enters electronic masking system 10 and is controlled to produce a predetermined masking pattern 24, which will be discussed in detail below. The laser beam, having being manipulated by electronic masking system 10, then exits electronic masking system 10 as predetermined masking pattern 24 and passes through a first plastic part 26, also known as a transmissive piece. Transmissive piece 26 generally permits the laser beam to pass therethrough without appreciable absorption or reflection. The laser beam is then absorbed by a second plastic part 28, also known as an absorptive piece. Absorptive piece 28 generally absorbs the radiative energy of the laser beam to produce heat in weld zone 30. This heat causes transmissive piece 26 and absorptive piece 28 to be melted at weld zone 30 and thus welded together upon cooling. It should be understood that electronic masking system 10 may also be positioned between laser source 18 and optional lens assembly 20 or, alternatively, various elements of electronic masking system 10 may be positioned on opposing sides of optional lens assembly 20.

Figure 2:
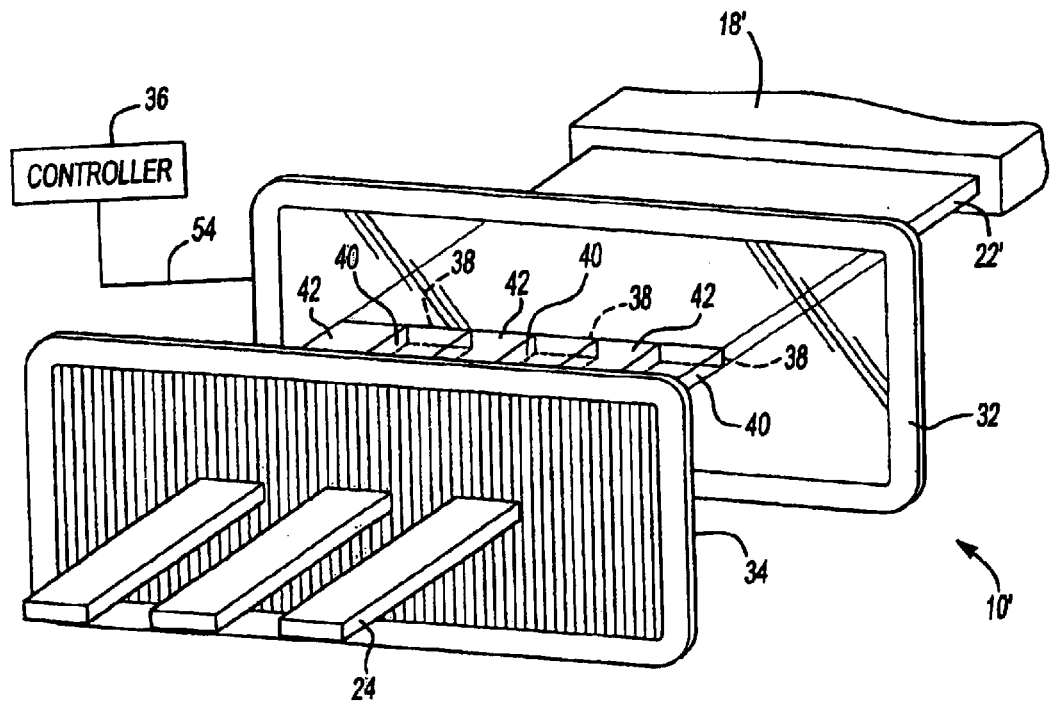
FIG. 2 is a schematic perspective view of the electronic masking system for use with a polarized laser beam, with portions removed for clarity, according to a first embodiment of the present invention.
Figure 3:
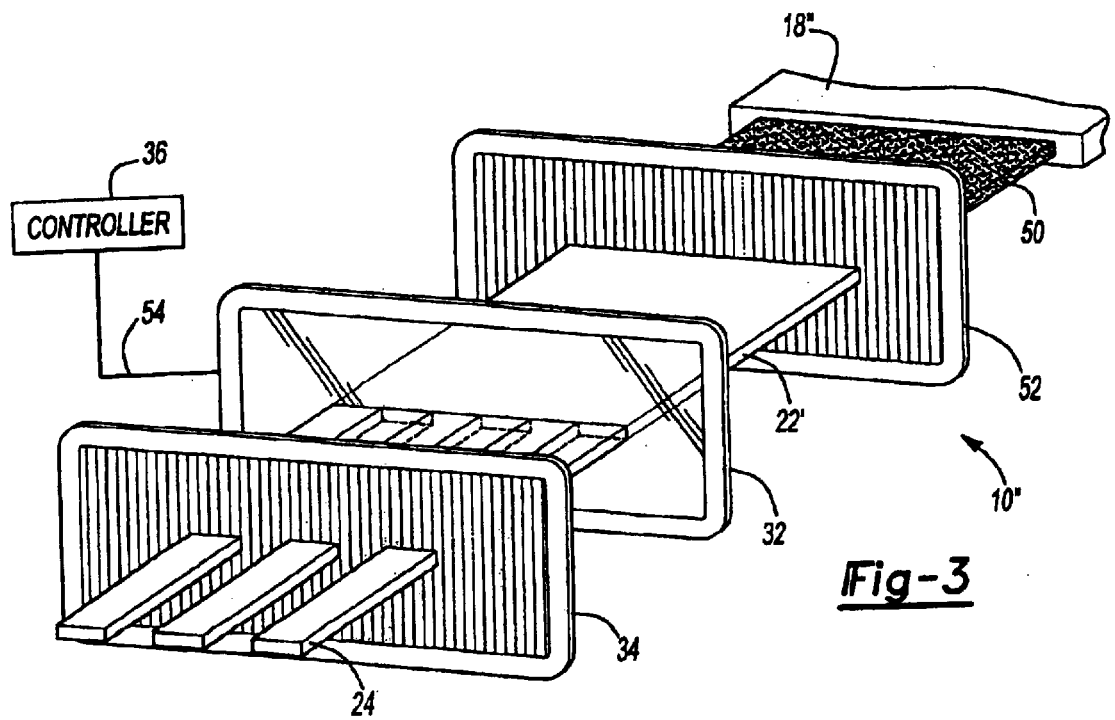
FIG. 3 is a schematic perspective view of the electronic masking system for use with an unpolarized laser beam, with portions removed for clarity, according to a second embodiment of the present invention.

With particular reference to FIGS. 2 and 3, electronic masking system 10 is described in relation to alternative laser sources. That is, FIG. 2 illustrates electronic masking system 10' for use in connection with polarized laser source 18'. By definition, polarized laser source 18' outputs a polarized laser beam, wherein vibration of light energy generally exists in a single plane. In this regard, the polarized laser beam passes through optional lens assembly 20 (not shown in this figure) and exited as polarized laser beam 22'. It should be noted that in this embodiment, optional fiber optic bundle 14 must be eliminated in order to ensure the polarized laser beam remains polarized without requiring further processing—that is, it is well known that if a polarized laser beam is transmitted through a fiber optic bundle, the polarized laser beam will exit the fiber optic bundle as an "un-polarized" laser beam due to the physical characteristics of the fiber optic bundle.

Still referring to FIG. 2, electronic masking system 10' comprises a Liquid Crystal Display (LCD) 32 and a polarizing filter 34 positioned "downstream" from LCD 32 relative to the direction of travel of polarized laser beam 22'. LCD 32 may be of any conventional design that is capable of changing the polarization of polarized laser beam 22'. That is, LCD 32 may be of any conventional design that is capable of polarizing selected portions of polarized laser beam 22' 90° (or any other desired angle) relative to its original orientation. Polarizing filter 34 is preferably a MICROWIRES™ polarizer available from PROFLUX. In operation, selected portions 38 of LCD 32 are energized or otherwise actuated via a controller 36 so that selected portions 38 polarize laser beam 22'. In this regard, the plane of vibration of laser beam 22', which passes through selected portions 38 of LCD 32, is rotated 90° relative to the original plane of vibration (generally indicated at reference 40). Still referring to FIG. 2, unmodified portions of laser beam 22' simply pass through LCD 32 and maintain their original plane of vibration (generally indicated at reference 42).

Modified portion 40 and unmodified portion 42 of laser beam 22' then impacts polarizing filter 34. Polarizing filter 34 then absorbs, reflects, or otherwise prevents passage therethrough of any portion of laser beam 22' whose plane of vibration is different from that permitted by polarizing filter 34. In other words, polarizing filter 34 is arranged to permit only a selected portion of laser beam 22' to pass therethrough. Therefore, in the present example, modified portion 40 of laser beam 22' may be permitted to pass through polarizing filter 34, while unmodified portion 42 is absorbed, reflected, or otherwise prevented from passing therethrough. It should be understood that the orientation of polarizing filter 34 may be changed such that a "negative" image is produced, wherein unmodified portion 42 of laser beam 22' is permitted to pass through polarizing filter 34, while modified portion 40 is absorbed, reflected, or otherwise prevented from passage. In effect, the process of modifying the plane of vibration of selected portions of laser beam 22' permits only discrete areas of laser beam 22' to pass through polarizing filter 34 and impact weld zone 30. Due to the manageability of LCD 32, these discrete areas literally may be configured to represent any two dimensional shape.

Turning now to FIG. 3, an electronic masking system 10" is provided for use in connection with unpolarized laser source 18". By definition, unpolarized laser source 18" outputs an unpolarized laser beam, wherein vibration of light energy generally exists in a multiple planes. In this regard, the polarized laser beam passes through optional lens assembly 20 (not shown in this figure) and exited as an unpolarized laser beam 50.

Still referring to FIG. 3, electronic masking system 10" comprises a Liquid Crystal Display (LCD) 32, a polarizing filter 34 positioned "downstream" from LCD 32 relative to the direction of travel of unpolarized laser beam 50, and a polarizing filter 52 positioned "upstream" of LCD 32. In this arrangement, unpolarized laser beam 50 impacts upstream polarizing filter 52. Upstream polarizing filter 52 polarizes unpolarized laser beam 50 such that unpolarized laser beam 50 exits upstream polarizing filter 52 as polarized laser beam 22' (having a single plane of vibration). Once unpolarized laser beam 50 is converted into polarized laser beam 22', LCD 32 and downstream polarizing filter 34 function as described above to provide masking pattern 24. In the interest of brevity, such operation of LCD 32 and downstream polarizing filter 34 will not be further discussed.

Turning now to the operation of controller 36 and LCD 32, it is anticipated that controller 36 is a computer, such as a desktop computer, having image creating software, such as POWERPOINT®, PHOTOSHOP®, PAINTSHOP PRO®, VISIO®, AUTOCAD®, and the like. However, controller 36 may simply be a computer capable of accessing a stored image and displaying said stored image on LCD 32. To this end, any one of a number of weld designs may be quickly and conveniently created, modified, saved, opened, and the like so as to permit masking pattern 24 varied. These designs are then output from controller 36 via a line 54 to LCD 32 and are "displayed" upon LCD 32. The "display" of the selected image causes corresponding selected portions of polarized laser beam 22' to be polarized 90° relative to its original orientation and, thus, define masking pattern 24 after passing through polarizing filter 34. According to the principles of the present invention, controller 36 and LCD 32 masking pattern 24 may be configured to define any one of a plurality of two-dimensional or three-dimensional images. Unlike conventional metal masking techniques, the present invention permits masking pattern 24 to include "unsupported" features, such as the center portion of the letters a, b, d, g, o, p, and q. These center portions traditionally required small support arms to connect them to the main section of the metal mask, such is common with stencils. However, the present invention permits such center portions to be formed without the need for any support arms.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of laser welding a first part to a second part, said method comprising:

outputting a laser beam;

passing said laser beam through a liquid crystal display, said liquid crystal display defining a predetermined pattern, said predetermined pattern causing a discrete portion of said laser beam to be polarized to define a modified, portion of said laser beam and an unmodified portion of said laser beam;

exposing said modified portion and said unmodified portion of said laser beam to a downstream polarizing filter such that only one of said modified portion and said unmodified portion of said laser beam pass therethrough to define a welding beam being shaped substantially similar to said predetermined pattern; and heating at least one of a first part and a second part with said welding beam to create a weld therebetween.

2. The method according to claim 1 wherein said laser beam is a polarized laser beam.

3. The method according to claim 1 wherein said laser beam is an unpolarized laser beam, further comprising:

exposing said unpolarized laser beam to an upstream polarizing filter positioned upstream of said liquid crystal display, said upstream polarizing filter polarizing said unpolarized laser beam.

4. The method according to claim 1, further comprising:

coupling a controller to said liquid crystal display, said controller outputting a signal to said liquid crystal display to define said predetermined pattern.

5. A method of laser imaging, said method comprising:

outputting a laser beam;

passing said laser beam through a liquid crystal display, said liquid crystal display defining a predetermined pattern, said predetermined pattern causing a discrete portion of said laser beam to be polarized to define a modified portion of said laser beam and an unmodified portion of said laser beam; and exposing said modified portion and said unmodified portion of said laser beam to a downstream polarizing filter such that only one of said modified portion and said unmodified portion of said laser beam pass therethrough to define an imaging beam being shaped substantially similar to said predetermined pattern.

6. The method according to claim 5 wherein said laser beam is a polarized laser beam.

7. The method according to claim 5 wherein said laser beam is an unpolarized laser beam, further comprising:

exposing said unpolarized laser beam to an upstream polarizing filter positioned upstream of said liquid crystal display, said upstream polarizing filter polarizing said unpolarized laser beam.

8. The method according to claim 5, further comprising:

coupling a controller to said liquid crystal display, said controller outputting a signal to said liquid crystal display to define said predetermined pattern.

9. A method of laser welding a first part to a second part, said method comprising:

outputting a laser beam through a laser source; and positioning an electronic masking system downstream from said laser source, said electronic masking system being operable to selectively polarize a discrete portion of said laser beam to define a weld beam having a predetermined pattern.

10. The method according to claim 9, further comprising:

outputting a signal from a controller;

coupling said controller to a liquid crystal display, said liquid crystal display operable to define a predetermined pattern thereon in response to said signal, said liquid crystal display polarizing a portion of said laser beam to define a modified portion and an unmodified portion; and positioning a first polarizing filter downstream from said liquid crystal display, said first polarizing filter operable to prevent passage of one of said modified portion and said unmodified portion of said laser beam therethrough.

11. The method according to claim 10, further comprising:

positioning a second polarizing filter upstream from said liquid crystal display, said second polarizing filter operable to polarize said laser beam.

12. The method according to claim 9, further comprising:

coupling an optic fiber between said laser source and said electronic masking system, said optic fiber transmitting said laser beam to said electronic masking system.

13. The method according to claim 9, further comprising:

coupling a lens assembly adjacent said electronic masking system.

* * * * *